July 4, 1967 A. W. BREWER 3,329,599
APPARATUS FOR MEASURING TRACE CONSTITUENTS
Original Filed Jan. 27, 1960 2 Sheets-Sheet 1
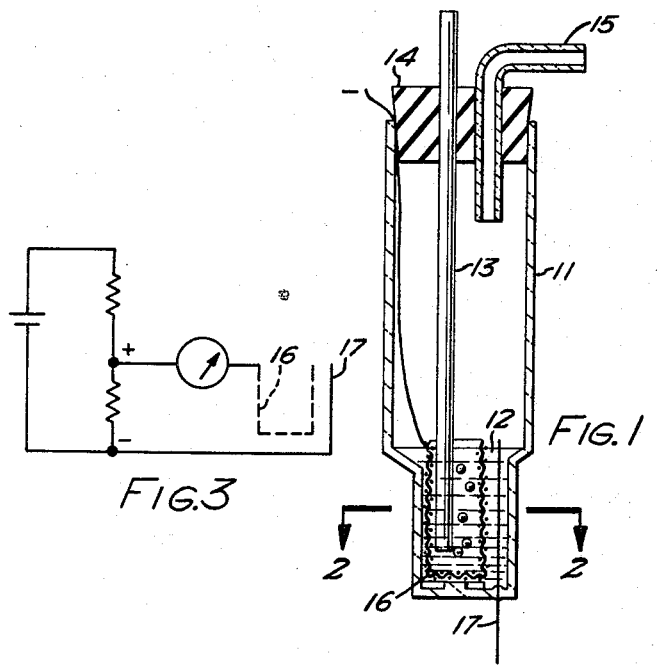
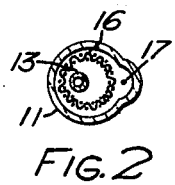
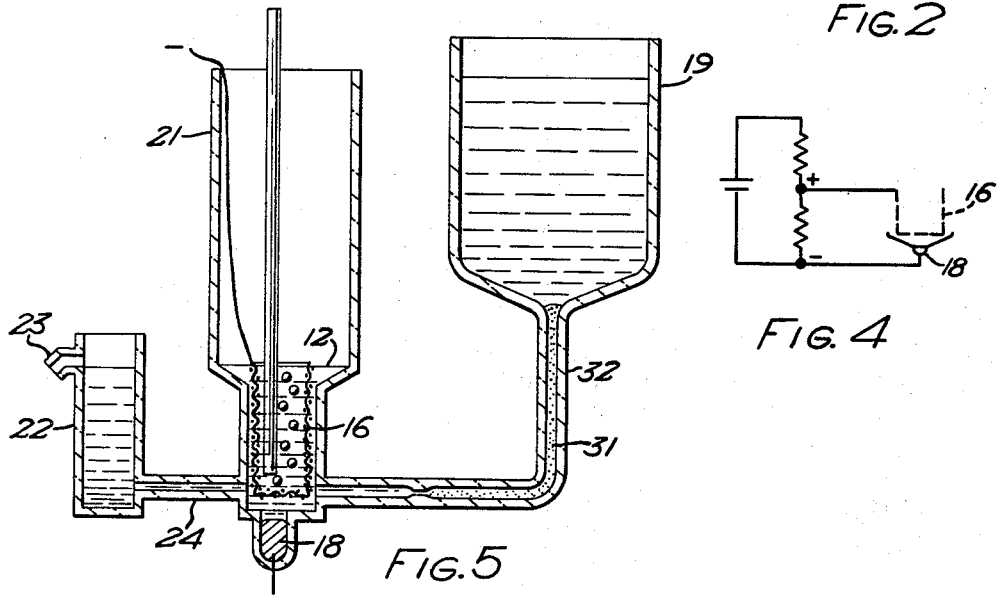
INVENTOR.
ALAN W. BREWER
BY Frederick E. Lange
ATTORNEY

INVENTOR.
ALAN W. BREWER

United States Patent Office 3,329,599
Patented July 4, 1967

3,329,599
APPARATUS FOR MEASURING TRACE CONSTITUENTS
Alan W. Brewer, Toronto, Ontario, Canada, assignor to Mast Development Company, Davenport, Iowa, a corporation of Iowa
Continuation of application Ser. No. 5,026, Jan. 27, 1960. This application Dec. 30, 1964, Ser. No. 422,282
8 Claims. (Cl. 204—195)

This application is a continuation of my co-pending application, Ser. No. 5,026, filed Jan. 27, 1960, now abandoned.

This invention relates to a method and apparatus for measuring trace constituents of fluid mixtures, and, more particularly to a method and apparatus for measuring the amount of iodine formed by the reaction between potassium iodide and an oxidizing agent.

The composition of the transparent ocean through which he wanders has been of importance to man since he first discovered that it is not everywhere uniform. At first, only the detection of toxic, or otherwise dangerous, constituents of the atmosphere were of interest. Recent, accelerated studies of atmospheric physics and atmospheric pollution, have clearly indicated the need for more accurate and consistent devices which are simple in construction, inexpensive, and which will detect and measure very minute quantities of trace constituents in a fluid.

One manner in which trace constituents of a fluid mixture can be accurately measured is by supplying a fixed amount of the fluid to be tested to an excess of a substance which will react chemically with the trace constituent, but which is substantially inert to the other constituents of the fluid. The amount of the compound formed by such reaction is then determined, as by weighing, to indicate the amount of trace constituent in the quantity of fluid tested.

However, for extended tests, either continuous or discontinuous, where results are to be correlated with time, location distance, speed or other changing dimensions, the "batch" type of measurement mentioned above is not suitable. Electrical measurements of the change in conductivity produced in a reagent by the reaction of a selected atmospheric constituent have been suggested. Consider, for example, the determination of the percentage of oxidizing agent present in an atmosphere.

It is well known that in iodide solutions the presence of free iodine can readily be detected by immersing two bright platinum electrodes in the solution and applying a small potential difference between them. In the presence of free iodine, but not otherwise, a small current flows, which current may be regarded as due to the depolarizing action of the iodine of the cathode; the following reactions taking place, at the cathode the iodine is converted into the iodide ion $$I_2 + 2e \rightarrow 2I^-  \qquad \text{(Equation 1)}$$

and at the anode the iodine is reformed from iodide ions $$2I^- - 2e \rightarrow I_2 \qquad \text{(Equation 2)}$$

The reformation of the iodine at the anode has limited the use of this method to measure the quantity of iodine present, and the method is therefore used only as a detector.

According to the invention, apparatus for the measurement of small quantities of iodine in aqueous solution comprises an electrolytic cell for containing the solution, said cell containing a first electrode of a metal or metals of the platinum group, a second electrode, and means for preventing iodine liberated at the second electrode from leaving the part of the cell containing the second electrode and passing to the first electrode.

In one construction, the means for preventing passage of iodine may comprise a surface layer or coating on the second electrode which reacts with iodine liberated thereat.

In a second alternative construction, the means for preventing passage of iodine may comprise a diaphragm through which iodide ions can pass but which prevents, or substantially prevents, passage of free iodine. Such a diaphragm may be made of conventional dialysis paper, for instance.

In use, a small potential difference which depends upon the nature of the second electrode is applied to the electrodes. No current will flow if no free iodine is present, but in the presence of free iodine a small current flows which is always in such a direction that electrons are passing out of the first electrode into the solution, while a reaction occurs in accordance with Equation 1 above at this electrode. In the first alternative construction referred to above, the current flows against the applied potential difference and the iodine reformed at the second electrode reacts with the material of the surface of the second electrode, which may be silver or mercury, for instance, to form a salt, e.g. silver iodide or mercurous iodide, the equations for these reactions being $$I^- - e + Ag \rightarrow AgI$$

or $$2I^- - 2e + 2Hg \rightarrow Hg_2I_2$$

Silver iodide and mercurous iodide are insoluble, so that the iodine is removed from the solution.

In the second alternative construction, the current flows with the applied potential difference and the iodine which is reformed at the second electrode, according to Equation 2, is prevented from recirculating by the diaphragm.

With either construction, the current flows until all the free iodine has been converted to iodide ions, and then ceases due to polarization of the first electrode. The quantity of electricity which flows is a measure of the quantity of iodine, according to the laws of electrolysis. In the case where a diaphragm is used, the quantity of iodine in the part of the cell containing the first electrode is thus measured. In the case where a reactive second electrode is used, the amount of iodine in the whole cell is measured. Quantities of iodine as small as about $10^{-8}$ gm. can be measured in this way.

The apparatus is particularly suitable for continuous use under conditions in which the iodine is being continuously formed by some chemical reaction and removed electrochemically. The continuous electric current passing through the cell is then related directly to the rate of formation of the free iodine, where one microampere equals $1.327 \times 10^{-9}$ grams of iodine per second.

The apparatus can be applied, for example, to the continuous or discontinuous measurement of small quantities of ozone, or other oxidants, in air. This measurement is important in meteorological and atmospheric pollution measurements. A buffered solution of an iodide is placed in the cell and the air is bubbled through it. The ozone reacts with the iodide to produce free iodine, which can then be measured as indicated above.

Although the above examples, and the specific descriptions which follow, use the detection of ozone by means of a reagent containing potassium iodide to illustrate the operation of the apparatus and the method of this invention, it should be borne in mind that this invention may be suitably used to detect and measure any trace constituents of a fluid. The ozone-potassium iodide example is used because, at this time, ozone is a common trace constituent being measured.

It is therefore, an object of this invention to provide new and improved means for measuring atmospheric contaminants.

It is another object of this invention to provide new and improved apparatus for measuring the quantity of fluid trace constituents of a fluid mixture.

It is a further object of this invention to provide a new method for measuring minute quantities of specific constituents of fluid mixtures.

Other objects and advantages of this invention will become apparent as the following description proceeds, which description should be considered together with the accompanying drawings, in which:

FIGURE 1 is a diagrammatic sectional view of an electrolytic cell incorporating the principles of this invention;

FIGURE 2 is a section on the line 2—2 of the cell of FIGURE 1;

FIGURE 3 is a circuit diagram including the cell of FIGURE 1;

FIGURE 4 is a view similar to FIGURE 1 of another form of an electrolytic cell;

FIGURE 5 is a circuit diagram including the cell of FIGURE 4;

Figure 6:
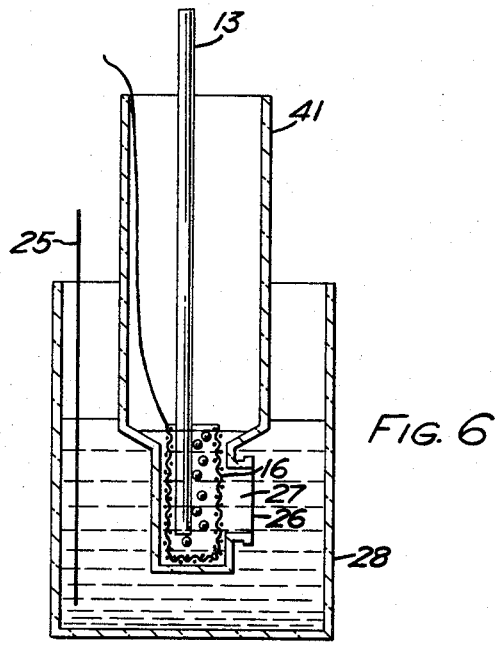
FIGURE 6 is a view similar to FIGURE 1 of another form of electrolytic cell.

FIGURES 1 to 3 illustrate one embodiment of the invention particularly suited to meteorological use and the measurement of the contaminant content of the atmosphere. The apparatus comprises a small vessel 11, of glass or other inert material, the vessel having a lower portion of reduced size constituting a reaction chamber containing an aqueous solution 12 of a suitable reagent which substantially fills the reaction chamber of the vessel and may be of the following composition:

|  | Percent |
| --- | --- |
| Potassium iodide | 0.1 |
| Disodium phosphate (anhydrous) | 0.1 |
| Monosodium phosphate (anhydrous) | 0.1 |

(The phosphates being included as a neutral buffer)

The vessel 11 is provided with a tube 13, extending into the reaction chamber and dipping into the solution 12, so that the sample of the fluid to be tested may be bubbled through the tube 13 into the solution 12 at a convenient rate which depends upon the size of the equipment and which may be of the order of 100 to 500 cc. per minute. The vessel 11 is closed by a stopper 14 through which a second tube 15 passes, so that gas can be sucked through the solution 12 instead of being blown through it. In this way, risk of contamination of the gas by a pump before its passage through the solution is avoided. The bubbling of the gas through the solution effects all the stirring that is necessary.

Immersed in the solution 12 in the vessel 11 are two electrodes 16 and 17. The first electrode 16 consists of a small cup of fine platinum gauze, and the second electrode 17 consists of pure silver wire of, say ½ to 1 mm. in diameter and about 1 to 2 cm. in length. The second electrode 17 is preferably arranged as shown in FIGURE 2, vertically at the far side of the electrode 16 from the tube 13, so as to minimize the risk of the electrode 17 becoming covered with bubbles and thereby insulated from the solution. As shown in both FIGURES 1 and 2, the wall of the vessel 11 adjacent electrode 17 is deformed to provide a groove on the interior surface thereof extending the full length of the lower portion of the vessel. The electrode 17 is located in this groove and is thus further protected against being exposed to bubbling action. Due to the fact that the lower portion constituting the reaction chamber is of smaller diameter, there is less reagent needed than would otherwise be the case. By keeping the reaction chamber as small as possible and by having the electrode in the form of platinum gauze of substantially the same exterior diameter and length as the interior diameter and length of the reaction chamber, there is no point in the liquid spaced very far from the electrode 16. This results in a rather complete reaction taking place. By means of the circuit shown in FIGURE 3, an electromotive force of about 0.42 volt is applied between the electrodes, with the first, or platinum, electrode 16 positive. When, for example, the reagent described above is used and ozone, or another oxidant, is present in the sample introduced into tube 13, free iodine is liberated according to the equation:

$$2KI+O_3+H_2O=2KOH+O_2+I_2$$

The free iodine is ionized and a current, accordingly, flows in a direction opposing the applied potential, as previously described, in proportion to the amount of ozone in the gas sample which is bubbled through.

The relation between the ozone concentration, the air or gas flow and the electric current is such that, if the air flow is 700 cc. per minute, a current of one microampere is obtained if the ozone concentration is one part per hundred million. For other flows and concentrations, the electric current changes proportionately.

Where comparatively large quantities of iodine have to be measured, an anode of silver wire is unsuitable because its surface becomes covered with a layer of silver iodide which impedes the flow of electric current. This difficulty may be avoided by use of a silver anode of large area or of silver sponge, or by using a mercury anode.

FIGURES 4 and 5 illustrate a second embodiment of the invention in which a mercury anode 18 is provided in the bottom of the vessel 21 in place of the silver electrode 17 of FIGURE 1. The mercury anode 18 remains active until all the mercury has been consumed.

The tube 13 and platinum cathode 16 are similar to those of FIGURE 1. The plug 14 and tube 15 have been omitted from the drawing for simplicity. This embodiment is also provided with means for ensuring a slow flow of reagent solution through the cell. This flow is too slow to remove free iodine, but is intended to replace water lost by evaporation and to prevent accumulation of dirt from the air stream or of the products of minor side reactions. A flow of 3 to 20 cc. per day according to the conditions will normally be sufficient. A supply of fresh solution is held in the reservoir 19 and passes to the vessel 21 through a capillary tube 32 which has an internal diameter of about 1 mm. and is filled with a chemically inert sand, as indicated at 31, to regulate the flow of solution. The level of the solution 12 in the vessel 21 is maintained constant by means of an auxiliary vessel 22 with an overflow 23. The auxiliary vessel 22 is connected to the vessel 21 by a capillary tube 24 of about ½ mm. internal diameter, so as to prevent bubbling of the gas through the tube 13 from interfering with the constant level device formed by the auxiliary vessel 22 and its overflow 23. The electric circuit for this embodiment is shown in FIGURE 4. The E.M.F. applied to the electrodes is approximately 0.32 volt, with the platinum electrode 16 positive.

In an alternative arrangement, the electrode 18 may be in the form of an amalgam with gold. Alternatively, a base metal may be used for the second electrode, but it should preferably be a metal which forms an insoluble iodide, so that the iodine with which it reacts is removed from the solution, though this is not essential to the use of the invention. The E.M.F. applied between the electrodes varies according to the metals used.

Figure 7:
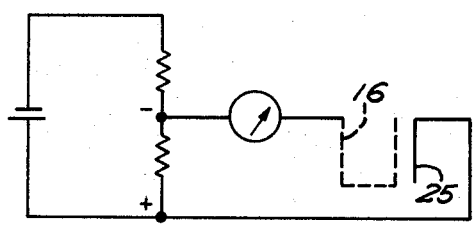
FIGURE 7 is a circuit diagram including the cell of FIGURE 6.

In another embodiment of the invention, illustrated in FIGURES 6 and 7, the electrodes 16 and 25 are both of platinum and are separated by a semi-permeable diaphragm 26, e.g. of dialysis paper, which permits the passage of iodide ions but substantially prevents the passage of free iodine.

The reaction vessel 41 is in this case provided with a lateral opening 27 near its lower end, and the diaphragm 26 is stretched over this opening. The cell is completed by an outer vessel 28 which contains the second electrode 25 and is partly filled with the reagent solution. The first electrode 16 and the tube 13 are the same as in the previously-described embodiments. The electric circuit is shown in FIGURE 7, the applied E.M.F. being approximately 0.15 volt. Electrode 16 is connected to the negative side of the source of potential and electrode 25 to the positive side. Free iodine in the solution in vessel 41 is converted to iodine ions at the first electrode 16 in accordance with Equation 1 above. These ions pass through the diaphragm 26 to the second electrode 25, where iodine is reformed in accordance with Equation 2, but this free iodine cannot recirculate back through the diaphragm 26 to the first electrode 16. Hence the current will cease if no further free iodine is introduced into the vessel 41.

This apparatus may be used to estimate the amount of free iodine in a specimen reagent, such as of potassium iodide solution, which is placed in the vessel 41. The tube 13 will then be used to bubble through the reagent a gas which is inert in relation to the materials concerned, simply for the purpose of stirring the solution. The amount of iodine can be calculated from the total amount of electricity which has passed, by the laws of electrolysis, whereby one coulomb is equivalent to 1.327 mg. of free iodine.

The apparatus may also be used continuously, as in the previous cases, by bubbling an inert gas containing a small concentration of a strong oxidizing agent through the tube 13.

In various embodiments, the first electrode 16 has been shown in each case as a cup of platinum gauze, but it may have other shapes. When it has the shape of a cup, as shown, it is preferably spaced from the wall of the vessel 11, 21, or 41 in order that the bubbling action should cause the maximum movement of solution through the gauze.

The concentration of the reagent solution may vary from 2% to 0.1%.

The above specification has described a new apparatus and method for measuring trace constituents of an atmosphere. It is realized that the description may suggest to those skilled in the art, other forms the invention may take. It is, therefore, intended that this invention be limited only by the scope of the appended claims.

What is claimed is:

1. Apparatus for measuring the amount of ozone in the atmosphere, said apparatus comprising a generally cylindrical vertically disposed vessel having a lower portion constituting a reaction chamber, said reaction chamber being relatively small in volume as compared with the remaining portion of the vessel, a cathode of platinum within said reaction chamber, said cathode being of generally hollow cylindrical form and in axial alignment with and having an exterior diameter and length substantially the same as the interior diameter and length of said reaction chamber, said chamber adapted to contain a reagent solution which substantially fills said reaction chamber and which includes a quantity of halide in ion form which reacts with said ozone to form free halogen, an anode exterior of and remote from said cathode and extending into said reaction chamber so as to be immersed in such a reagent solution, said anode being of a material which anodizes and forms a product which does not dissolve in the reagent solution, means for forcing samples of said atmosphere into the lower interior of said cathode beneath the surface of such a reagent solution and thence out of said chamber thereby circulating such a reagent solution, and current measuring means for measuring current flow between said anode and cathode.

2. The apparatus of claim 1 in which said platinum cathode is formed of platinum gauze.

3. The apparatus of claim 1 in which said anode is a silver wire and extends generally parallel to said cathode and out of the path of bubbles formed by circulating said samples of atmosphere.

4. Apparatus for measuring the proportion of a trace constituent contained within a sample of gas, said apparatus comprising a generally cylindrical vertically disposed vessel having a lower portion constituting a reaction chamber with an interiorly disposed groove in the wall of said chamber extending lengthwise thereof to provide an elongated pocket displaced from the main portion of said chamber along at least a portion of the interior surface thereof, a first electrode of platinum within said reaction chamber, said cathode being of generally hollow cylindrical form and in axial alignment with and at substantially the same exterior diameter and length as the interior diameter and length of the portion of said vessel constituting said reaction chamber exclusive of said grooved region, a second electrode of silver wire within said groove, said chamber being designed to contain a reagent which at least partially fills said chamber so as to at least partially cover said electrodes and which reacts with the trace constituent to be measured to produce a depolarizing agent in proportion to the number of molecules entering the reaction, means for forcing samples of the gas to be tested into the lower interior of said platinum electrode beneath the surface of such a reagent and thence out of said chamber thereby circulating such a reagent, and means for connecting said electrodes to a means for measuring current flowing between said first and second electrodes.

5. Apparatus for measuring the proportion of a trace constituent contained within a sample of gas, said apparatus comprising a generally cylindrical vertically disposed vessel having a lower portion constituting a reaction chamber with an interiorly disposed groove in the wall of said chamber and extending lengthwise thereof to provide an elongated pocket displaced from the main portion of said chamber along at least a portion of the interior surface thereof, a first electrode of platinum within said reaction chamber, said cathode being of generally hollow cylindrical form and in axial alignment with and at substantially the same exterior diameter and length as the interior diameter and length of the portion of said vessel constituting said reaction chamber exclusive of said grooved region, a second elongated electrode within said groove, said chamber being designed to contain a reagent which at least partially fills said chamber so as to at least partially cover said electrodes and which reacts with the trace constituent to be measured to produce a depolarizing agent in proportion to the number of molecules entering the reaction, said second electrode being of a material which anodizes and forms a product which does not dissolve in the reagent solution, means for forcing samples of the gas to be tested into the lower interior of said platinum electrode beneath the surface of such a reagent and thence out of said chamber thereby circulating such a reagent, and means for connecting said electrodes to a means for measuring current flowing between said first and second electrodes.

6. The apparatus of claim 1 in which there is means for continuously replenishing said reagent with fresh reagent.

7. The apparatus of claim 1 in which the second electrode is located in a lower extension of said chamber beneath the portion thereof in which said first electrode is located.

8. The apparatus of claim 1 in which the metal used for the second electrode is mercury.

References Cited

UNITED STATES PATENTS

| | | | |
|---|---|---|---|
| 2,643,223 | 6/1953 | Notvest | 204—195 |
| 2,757,132 | 7/1956 | Northrop | 204—195 |
| 2,758,079 | 8/1956 | Eckfeldt | 204—195 |
| 2,805,191 | 9/1957 | Hersch | 204—1.1 |
| 2,939,827 | 6/1960 | Jacobson et al. | 204—195 |
| 3,028,317 | 3/1962 | Wilson et al. | 204—195 |

FOREIGN PATENTS 1,219,596  12/1959  France.

OTHER REFERENCES

Gluckauf et al.: "J. of the Chemical Soc.," 1944, pp. 1–4.

HOWARD S. WILLIAMS, *Primary Examiner.*

JOHN H. MACK, *Examiner.*

T. TUNG, *Assistant Examiner.*